(12) United States Patent
Buhrke

(10) Patent No.: US 7,341,134 B2
(45) Date of Patent: Mar. 11, 2008

(54) CLUTCH AND BRAKE UNIT

(75) Inventor: Frank Buhrke, Weinheim (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/911,940

(22) Filed: Aug. 5, 2004

(65) Prior Publication Data

US 2005/0067247 A1 Mar. 31, 2005

(30) Foreign Application Priority Data

Sep. 30, 2003 (DE) ............................... 103 45 321

(51) Int. Cl.
*F16D 13/52* (2006.01)
*F16D 67/04* (2006.01)

(52) U.S. Cl. ..................... 192/14; 192/18 A; 192/48.8; 192/87.11

(58) Field of Classification Search ................. 192/14, 192/16, 70.19, 87.11, 87.15
See application file for complete search history.

(56) References Cited

U.S. PATENT DOCUMENTS

| | | | |
|---|---|---|---|
| 2,510,917 A * | 6/1950 | Turner et al. .................. 192/16 |
| 2,650,995 A * | 9/1953 | Wendel ..................... 192/18 R |
| RE24,371 E * | 10/1957 | Fuge ........................ 192/18 R |
| 3,039,440 A | 6/1962 | Warnock |
| 3,227,253 A | 1/1966 | Becker et al. |
| 3,432,014 A | 3/1969 | Mayuki |
| 3,747,727 A | 7/1973 | Dach et al. ................ 192/18 A |
| 3,760,918 A * | 9/1973 | Wetrich et al. .......... 192/87.11 |
| 4,610,181 A * | 9/1986 | Houley et al. ............ 192/18 A |
| 5,026,334 A * | 6/1991 | Jeffries ..................... 192/18 A |
| 5,462,147 A | 10/1995 | Sherman ................... 192/18 A |

FOREIGN PATENT DOCUMENTS

| | | |
|---|---|---|
| DE | 509 472 | 10/1930 |
| DE | 630 417 | 5/1936 |
| DE | 14 75 278 | 8/1969 |
| DE | 40 19 792 A1 * | 7/1991 |
| DE | 43 32 466 | 3/1995 |
| EP | 1 052 421 | 11/2000 |
| EP | 1 174 632 | 1/2002 |
| FR | 2.095.167 | 6/1971 |
| WO | WO 01/42673 | 6/2001 |

OTHER PUBLICATIONS

European Search Report, Feb. 22, 2007, 3 Pages.

* cited by examiner

*Primary Examiner*—Rodney H. Bonck

(57) ABSTRACT

A clutch and/or brake unit is described with at least three components that can rotate relative to each other, each of which is connected, fixed against rotation, with at least one disk. The disks can selectively be brought into frictional engagement, friction locked, with each other. In order to permit a simplified configuration, that can be manufactured simply and cost effectively, it is proposed that at least one first disk be connected, fixed against rotation, with a first component which is connected, fixed against rotation, to a disk that is connected, fixed against rotation, to a second component which can be brought into frictional engagement over a radially outer friction lining. Furthermore the at least one first disk can be brought into frictional engagement with at least one third disk connected, fixed against rotation, to the third component over at least one radially inner friction lining.

13 Claims, 3 Drawing Sheets

CLUTCH AND BRAKE UNIT

FIELD OF THE INVENTION

The present invention relates generally to torque transfer device such as a clutch or brake unit with at least three components that can rotate relative to each other, with which at least one disk is connected, fixed against rotation, and where the disks can selectively be brought into frictional engagement.

BACKGROUND OF THE INVENTION

Many conventional torque transfer devices including both clutch and brake units are equipped with a disk carrier in which at least one disk is located for an outer clutch and/or brake unit and at least one further disk is located for an inner clutch and/or brake unit. The inner and outer disks are usually connected with the disk carrier by means of a spline tooth engagement. Therefore two different disks are required for two clutch and/or brake units, that are connected, fixed against rotation, with one component, the disk carrier.

Accordingly, there is a clear need in the art to define a clutch and/or brake unit of the aforementioned type that is provided with a simplified configuration and that can be manufactured simply and at low cost.

SUMMARY OF THE INVENTION

A torque transfer device, hereinafter the clutch and/or brake unit, according to the invention, contains at least three components that can rotate relative to each other, with which in each case at least one disk is connected, fixed against rotation. The disks can be brought selectively into frictional engagement, in a friction lock with each other. The invention is distinguished by a so-called single disk design. This is characterized by at least one first disk that is connected with a first component, fixed against rotation, that can be brought into frictional engagement over at least one radially outer friction lining with at least one second disk that is connected, fixed against rotation, with a second component, and which can be brought into frictional engagement over at least one radially inner friction lining with at least one third disk connected to a third component, fixed against rotation, over at least one radially inner friction lining.

The clutch and/or brake unit, according to the invention, has a simple configuration since now only a single disk is required in place of an inner and outer disk each that are otherwise required, which is associated with an inner clutch and/or brake unit as well as an outer clutch and/or brake unit. This configuration leads to a simplified design that can be manufactured at low cost. It is advantageous to configure the at least one disk as a plane, disk-shaped component.

The invention is appropriate not only for clutch and/or brake units with a single first disk, that interacts with second and third disks. Rather it can also be applied to multi-disk clutches and/or brakes, where at least one component is connected with a disk package, that includes each of the at least one disk. In other words: The at least one first disk is an element of a first disk package and/or the at least one second or third disk is an element of a second or a third disk package. By the use of a disk package in place of a single disk configuration, a smaller design can be attained in the radial direction with equal torque capacity.

The frictional engagement (in clutch or brake) between the at least one first disk or the first disk package and the at least one second disk or the second disk package as well as the frictional engagement (in clutch or brake) between the at least one first disk or first disk package and the at least one third disk or third disk package is preferably performed by mechanical actuation (for example, by levers, by a ball ramp principle, wedges or the like), by hydraulic actuation (for example, by means of a piston), by pneumatic actuation (for example, by means of a piston) or by electric actuation (for example, by the use of an electric motor). Moreover the disk packages are most appropriately clamped by means of a multi-disk clutch in order to transmit torque.

The two frictional engagements can be shifted independently of each other. Elements of at least one of the two frictional engagements should be capable of being shifted axially in order to avoid any tilting of the disks when both frictional engagements are actuated simultaneously, as well as to also equalize any differing wear of the friction linings applied to the disks.

The arrangement, according to the invention, in particular permits the following possible connections between the components:

With a first driving component mounted on a rotating shaft, the first component can be connected with the second component or with the third component or with the second component as well as with the third component. With a second driving component mounted on a rotating shaft, the second component can be connected with the first component or with the first component as well as with the third component. With a third driving component mounted on a rotating shaft, the third component can be connected with the first component or with the first component as well as with the second component.

A particularly preferred further development of the invention provides that the first component is a disk carrier with at least one, preferably with at least two axially projecting bridges (drivers) that engage corresponding recesses in at least the one first disk. Here the first component (disk carriers) can be configured as a one-piece component with the bridges or as a multi-piece component.

The bridges of the first component (disk carrier) may be configured in various ways. In that way it is advantageous for manufacturing reasons to configure the bridges essentially as cylindrical objects, so that they engage in circular openings of the at least first disk. Nevertheless, other positive locking connections between the disk carrier and the disks are conceivable (for example, circular segments as drivers).

If the disk is provided with bores or stamped recesses, the bridges of the first component (disk carrier) can enter into these bores or stamped recesses, so that the disk is connected in a positive lock with the first component. With this embodiment the result is a relatively simple manufacturing operation for the bridges of the first component as well as the recesses (bores/stamped recesses) of the disk. This permits a cost effective configuration of a shaft to hub connection, that is used for the transmission of torque. In the case of a disk carrier or a disk, only a shaft-to-hub connection is necessary. A simple mounting of the first component is possible, that can also be accomplished by means of a dog clutch for the separation between the carrier and the disk.

Preferably the at least one radially outer friction lining is located radially outward of the bridges (the diameter range in which the bridges are arranged) and the at least one inner friction lining is located radially inward of the bridges.

According to a further preferred embodiment of the invention at least one disk can be moved axially relative to the component carrying it. In particular the at least one first, second and/or third disk or the first, second and/or third disk package can be moved axially relative to the first, second and/or third component. For example, the first disk can be moved axially on the bridges of the first component (disk carrier).

According to a preferred embodiment of the invention, the at least one first disk is not equipped with a friction lining and the at least one second and third opposing disks are equipped with a friction linings. Alternatively thereto, it may also be advantageous to equip the at least one first disk with a continuous friction lining (over the entire side of the disk). According to a further advantageous embodiment, regions of differing friction linings are provided that permit differing friction coefficients. If necessary, grooves can also extend in the surfaces of the disks, that are variously configured in different regions of the surface of the disks.

Preferably areas of differing friction linings and different groove configurations are arranged concentrically to each other.

It may be advantageous that at least one disk interacts with a brake caliper, through which this disk and with it the associated component can be braked and brought to rest with respect to a gearbox housing.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

Figure 1:
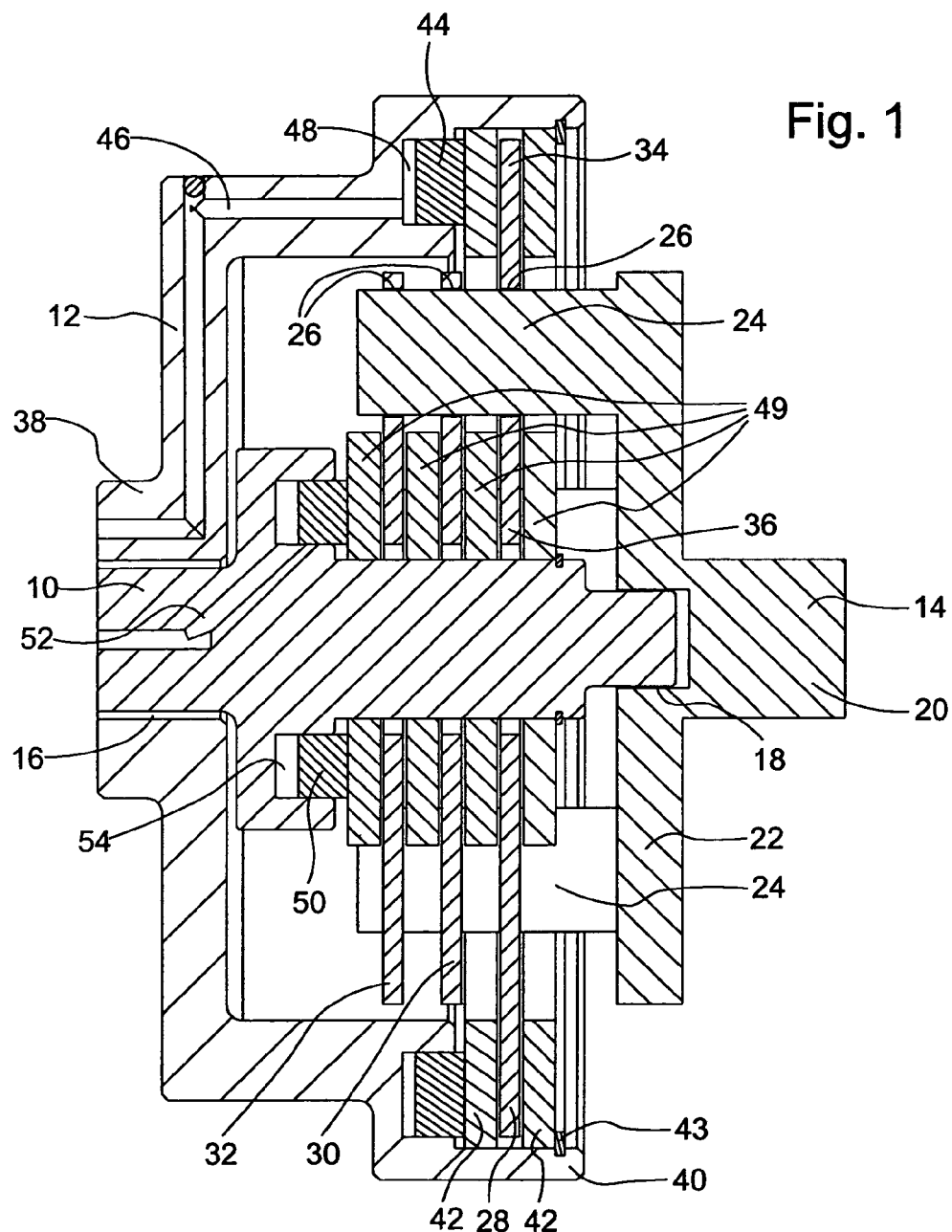
FIG. 1 is a cross section view of the first embodiment of a clutch unit according to the invention.

The clutch unit shown in FIG. 1 contains as a second component a shaft 10 on whose one end a bell-shaped clutch housing 12 used as third component is supported in bearings and on whose other end a disk carrier 14, used as first component, is supported in bearings, in each case free to rotate. The bearing location 16 between the second and the third components 10, 12 as well as the bearing location 18 between the second and the first component can be configured as usual sliding bearings, needle bearings or roller bearings that permit a relative rotation of the three components 10, 12, 14 with respect to each other.

The disk carrier 14 contains a connecting shaft 20, that carries a flange-shaped component 22. Three bridges 24 are formed onto the flange-shaped component 22, distributed uniformly around its circumference, these bridges extend axially into the bell-shaped clutch housing 12 and are used as drivers, two of these are shown. According to the embodiment shown the bridges 24 are configured as cylindrical pins, but could fundamentally be provided with other cross sectional shapes. The bridges 24 extend through circular bores 26 that are configured in three plate-shaped disks 28, 30, 32 which extend radially, so that a positive locking connection is formed between the disk carrier 14 and the three disks 28, 30, 32, that permit the transmission of torques. A first disk 28 is provided with a larger outside diameter than the other two disks 30, 32 that are arranged adjacent to the first disk 28. The three disks 28, 30, 32 can be slid axially on the bridges 24. The radial region and the height of the bridges 24 on which the three circular bores 26 are located subdivides the first disk 28 into a ring-shaped outer contact area 34 and a ring-shaped inner contact area 36.

The bell-shaped clutch housing 12 is configured as a pot-shaped component and contains a hub region 38 at an axial end and a ring region 40 at the other axial end. Within the ring region 40 two outer opposing disks 42 are arranged that can be shifted axially and are fixed against rotation. A blocking ring 43 retains the outer opposing disks 42 into the bell-shaped clutch housing 12. The outer opposing disks 42 are provided with ring-shaped contact areas on both sides that correspond to the outer contact area 34 of the disk 28. The disk 28 and the outer opposing disks 42 are part of a clutch, which furthermore contains a clutch piston 44 that can be moved axially. If fluid, for example, hydraulic fluid, is conveyed through an oil channel 46 into the clutch pressure chamber 48, then the clutch piston 44 moves in the axial direction and presses the first disk 28 and the two outer opposing disks 42 against each other, whereupon a friction locking connection is formed and torque can be transmitted between the bell-shaped clutch housing 12 and the disk carrier 14.

Four inner opposing disks 49 are arranged, fixed against rotation and axially moveable on the shaft 10, these disks are arranged in layers alternately with the three disks 28, 30, 32 carried by the disk carrier 14 and that form a disk package. The inner opposing disks 49 are provided with ring-shaped contact areas which correspond with the inner contact areas 36 of the disks 28, 30, 32. The disks 28, 30, 32 and the inner opposing disks 49 are part of a radially inner clutch, which moreover contains an axially moveable clutch piston 50. If fluid, for example, hydraulic fluid, is conveyed through an oil channel 52 into the clutch pressure chamber 54, then the clutch piston 50 moves in the axial direction and presses the disks 28, 30, 32 and the four inner opposing disks 49 against each other, whereby a friction locking connection is formed and torque can be transmitted between the shaft 10 and the disk carrier 14.

The three components shown in FIG. 1 (shaft 10, bell-shaped clutch housing 12 and disk carrier 14) are components of a total gearbox, not described in any further detail. Fundamentally, each of these components 10, 12, 14 can be arranged within a stationary gearbox housing, not shown, so that they can be rotated, and so that the outer contact areas 34 of the disks 28 in each case form a clutch with the outer opposing disks 42 as well as the inner contact areas 36 of the disks 28, 30, 32 with the inner opposing disks 49 as described. However it is also possible that one of the components 10, 12, 14 is connected to the gearbox housing, fixed against rotation. For example, the bell-shaped clutch housing 12 may be part of the stationary gearbox housing.

Then the outer contact areas 34 of the disk 28 operate as brake with the outer opposing disks 42 by means of which the disk carrier 14, that can be rotated, can be braked. Simultaneously, the shaft 10 can also be braked by engaging the inner clutch.

Figure 2:
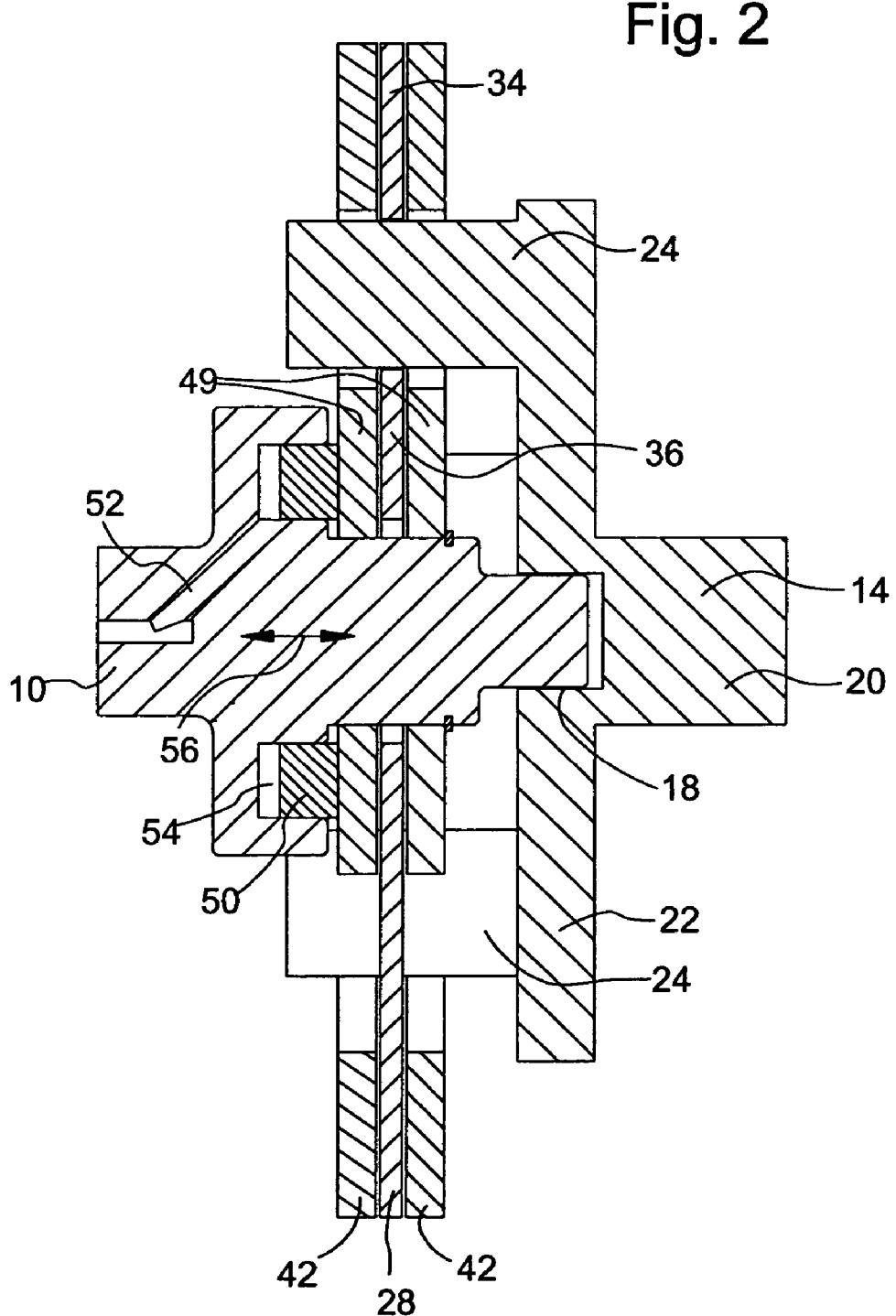
FIG. 2 is a cross section view of a partial region of a second embodiment of a clutch unit according to the invention.

FIG. 2 shows a partial region of a second embodiment of a clutch unit, according to the invention, that agrees in many details with the embodiment according to FIG. 1 and that operates generally in the same manner, so that the same components are identified with the same part number callouts. The embodiment according to FIG. 2 differs from the embodiment shown in FIG. 1 generally in that only a first disk 28 is connected with the disk carrier 14, fixed against rotation, whose outer region interacts with two opposing disks 42, which are connected, fixed against rotation, with a bell-shaped clutch housing, not shown, and that the inner region 36 of the first disk 28 interacts with only two opposing inner disks 49 which are connected with the shaft 10, fixed against rotation. The double arrow 56 indicates that an axial movement can be performed in both directions.

Figure 3:
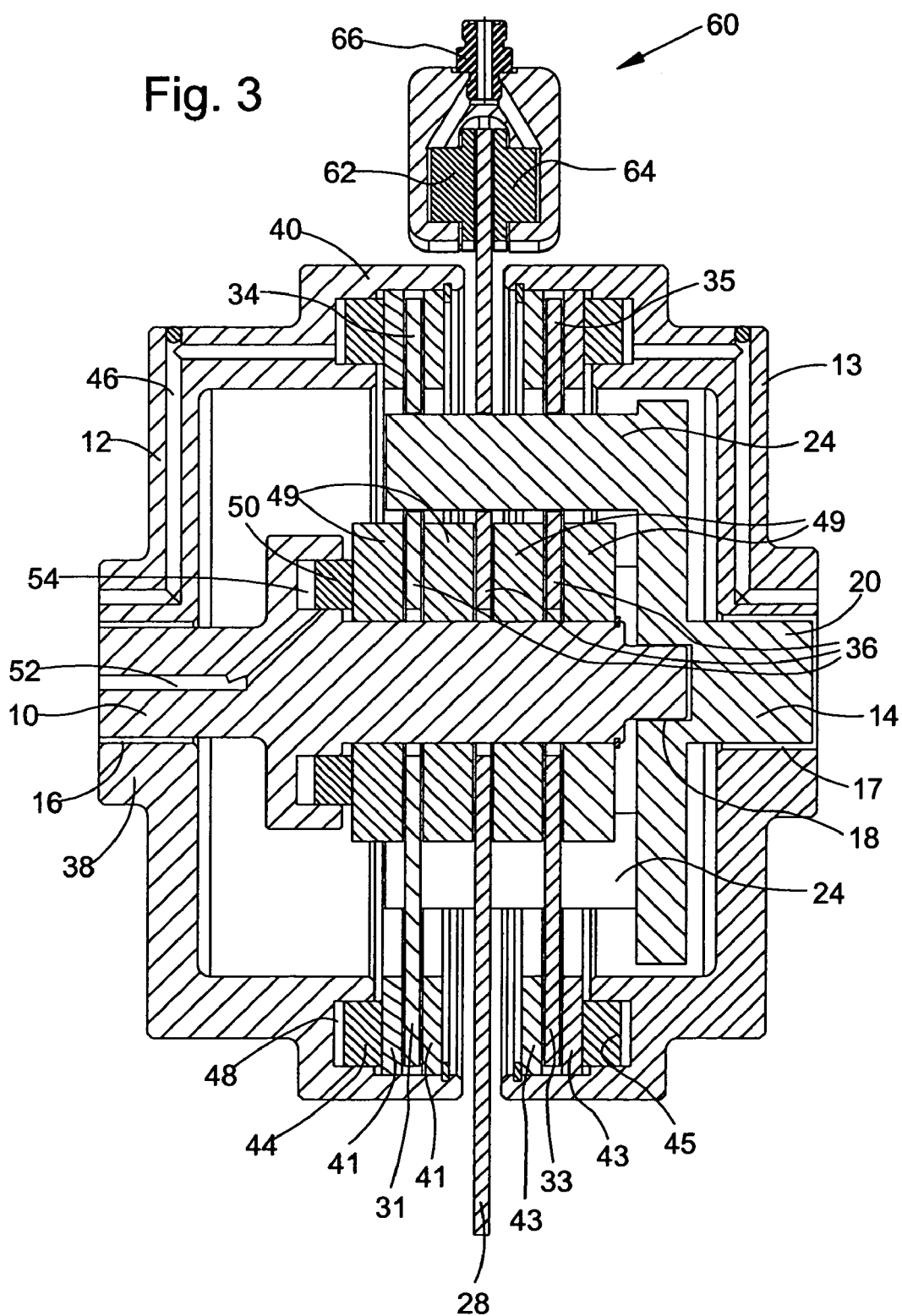
FIG. 3 is a cross section view of a third embodiment of a clutch unit according to the invention.

In FIG. 3 the same part number call-outs are also used to identify equivalent parts as in FIG. 1. According to FIG. 3, two bell-shaped clutch housings 12, 13 are used. The left bell-shaped clutch housing 12 is supported in bearings 16, free to rotate, on the shaft 10, the second, right bell-shaped clutch housing 13 is supported in a bearing 17, free to rotate, on the connecting shaft 20 of the disk carrier 14. A center disk 28, a left disk 31 and a right disk 33 are connected, free to rotate, to the disk carrier 14 over the drivers 24.

The outside diameter of the center disk 28 is larger than the outside diameter of the two bell-shaped clutch housings 12, 13, so that the center disk 28 extends outward between the two bell-shaped clutch housings 12, 13. A hydraulically actuated brake caliper 60 engages the ring region of the center disk 28 that projects outward, it contains two brake pistons 62, 64 which apply contact force to both sides of the outer ring region of the center disk 28 when pressurized fluid is supplied over a hydraulic connection 66, so that the center disk 28 is braked and with it the disk carrier 14.

The outer contact areas 34 of the left disk 31 interact with two outer opposing disks 41 arranged, fixed against rotation, in the left bell-shaped clutch housing 12, which can be brought into friction locking contact by a clutch piston 44, resulting in a first clutch. The outer contact areas 35 of the right disk 33 interact with the two outer opposing disks 43 arranged, fixed against rotation, in the right bell-shaped clutch housing 13, which are brought into frictional engagement, friction locking, by a clutch piston 45, resulting in a second clutch. The left bell-shaped clutch housing 12 and/or the right bell-shaped clutch housing 13 can be selectively connected by the first or the second clutch with the disk carrier 14.

The inner contact areas 36 of the center disk 28, the left disk 31 and the right disk 33 interact with inner opposing disks 49, that are arranged on the shaft 10, fixed against rotation. When pressure is applied to the piston 50 the disk package consisting of the center, the left and the right disks 28, 31, 33 as well as the four inner opposing disks 49 are pressed together, resulting in a friction locking engagement and the shaft 10 is connected with the disk carrier 14, fixed against rotation.

The two bell-shaped clutch housings, the shaft 10 and the connecting shaft 20 of the disk carrier 14 can each be used as input or output shafts for the clutch and brake units shown in FIG. 3.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The embodiments of the invention in which an exclusive property or privilege is claimed are defined as follows:

1. A torque transfer device having at least three components that can rotate relative to each other with each component having at least one disk connected therewith and fixed against relative rotation thereto, where the disks can be brought selectively into a frictional locking engagement, wherein at least one first disk is connected and fixed against relative rotation, to a first component which can be brought into frictional engagement with a second disk connected and fixed against relative rotation to at least a second component, over at least one radially outer friction lining, and which can be brought into frictional engagement with a third disk connected and fixed against relative rotation to at least a third component, over at least one radially inner friction lining, the at least one first disk being capable of being brought into engagement with both the second disk and the third disk at the same time wherein each of the first, second, and third components can rotate independently of one another when the respective first, second and third disks are not engaged and the first, second, and third components rotate as one unit, if all of the first, second, and third disks are engaged with one another.

2. A torque transfer device according to claim 1, wherein at least one disk is configured in the form of a flat plate.

3. A torque transfer device according to claim 2, wherein a disk package is connected with at least one component and includes, in each case, at least one disk.

4. A torque transfer device, according to claim 3, wherein the disks or the disk packages are clamped together to transmit torque.

5. A torque transfer device according to claim 1, wherein the first component is a disk carrier having at least one bridge projecting axially that engages corresponding recesses of the at least one first disk.

6. A torque transfer device according to claim 5, wherein the at least one bridge is generally configured cylindrically and engages circular openings in the at least one first disk.

7. A torque transfer device according to claim 5, wherein the at least one radially outer friction lining is located radially outward of the at least one bridge and the at least one radially inner friction lining is located radially within the at least one bridge.

8. A torque transfer device according to claim 1, wherein at least one disk can be moved axially with respect to the components that carry it.

9. A torque transfer device according to claim 1, wherein at least one first disk is not equipped with a friction lining, and the at least one second and third opposing disk are equipped with friction linings.

10. A torque transfer device according to claim 1, wherein the at least one first disk is equipped with a continuous friction lining.

11. A torque transfer device according to claim 1, wherein areas of different friction linings are provided.

12. A torque transfer device according to claim 11, wherein the areas of different friction linings are arranged concentrically to each other.

13. A torque transfer device according to claim 1, wherein at least one disk interacts with a brake caliper.

* * * * *